(12) United States Patent
Lim

(10) Patent No.: US 12,397,816 B2
(45) Date of Patent: Aug. 26, 2025

(54) CONTROL APPARATUS FOR AUTONOMOUS VEHICLE AND METHOD THEREOF

(71) Applicants: HYUNDAI MOTOR COMPANY, Seoul (KR); Kia Corporation, Seoul (KR)

(72) Inventor: Hong Yeol Lim, Incheon (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 473 days.

(21) Appl. No.: 17/857,269

(22) Filed: Jul. 5, 2022

(65) Prior Publication Data
US 2023/0219596 A1 Jul. 13, 2023

(30) Foreign Application Priority Data
Jan. 11, 2022 (KR) ................. 10-2022-0003993

(51) Int. Cl.
*B60W 60/00* (2020.01)
*G06F 9/48* (2006.01)

(52) U.S. Cl.
CPC ......... *B60W 60/001* (2020.02); *G06F 9/4881* (2013.01)

(58) Field of Classification Search
CPC .... B60W 60/001; B60W 50/06; B60W 30/06; B60W 30/18; B60W 50/00; B60W 60/0011; B60W 2050/0062; B60W 2050/0075; B60W 2050/0082; B60W 2050/009; B60W 2050/0095; B60W 2050/0096; G06F 9/4881; G06F 9/4887
USPC ......................................... 701/23
See application file for complete search history.

(56) References Cited

U.S. PATENT DOCUMENTS

2020/0254906 A1* 8/2020 Luchner .................. B60T 7/042
2020/0326701 A1* 10/2020 Takechi ................ H04W 4/021

FOREIGN PATENT DOCUMENTS

CN 114637598 A * 6/2022 ........... B60R 16/023

* cited by examiner

*Primary Examiner* — Tiffany P Young
*Assistant Examiner* — Shien Ming Chou
(74) *Attorney, Agent, or Firm* — MORGAN, LEWIS & BOCKIUS LLP

(57) ABSTRACT

A control apparatus and method for an autonomous vehicle includes a plurality of cores, and a scheduler that schedules a plurality of tasks corresponding to each operation mode of the autonomous vehicle for each of the cores, and adjusts an execution time of a task in the each core based on a current operation mode of the autonomous vehicle.

14 Claims, 9 Drawing Sheets

|  | DRIVING MODE Task | | | PARKING MODE Task | | | |
|---|---|---|---|---|---|---|---|
|  | Task A | Task B | ... Task G | Task 1 | Task 2 | ... | Task 7 |
| DRIVING MODE WCET | 10ms | 9ms | 5ms | 0.1ms | | | |
| PARKING MODE WCET | 0.1ms | | | 1ms | 5ms | ... | 20ms |

FIG.4

```
RT_Budget_Pram_set (MODE) {
  if (MODE == DRIVING) {
    HDP_RT_Budget = Value_of_HDP_RT_Budget  //10ms
  }
  else if (MODE == PARKING) {
    RSPA_RT_Budget = Min_RT_Budget  //0.1ms
  }
  else {
    FailSafe_Processing ();
  }
}
```

FIG.5

```
RSPA (MODE) {
  if (MODE == DRIVING) {
    return PARKING;         //idle processing
  }
  else if (MODE == PARKING) {
    RSPA_Processing ();     //running processing
  }
  else {
    FailSafe_Processing ();
  }
}
```

FIG.6

```
HDP (MODE) {
  if (MODE == DRIVING) {
    HDP_Processing ();      //running processing
  }
  else if (MODE == PARKING) {
    return DRIVING;         //idle processing
  }
  else {
    FailSafe_Processing ();
  }
}
```

FIG.7

CONTROL APPARATUS FOR AUTONOMOUS VEHICLE AND METHOD THEREOF

CROSS-REFERENCE TO RELATED APPLICATION

The present application claims priority to Korean Patent Application No. 10-2022-0003993, filed on Jan. 11, 2022, the entire contents of which is incorporated herein for all purposes by this reference.

BACKGROUND OF THE PRESENT DISCLOSURE

Field of the Present Disclosure

The present disclosure relates to a technology capable of operating an autonomous vehicle in a driving mode as well as a parking mode.

Description of Related Art

In general, an autonomous vehicle can recognize a road environment by itself, may determine a driving situation, and may control various systems in the vehicle, including a steering device, to move from a current position to a target position along a driving route. In the instant case, the various systems may include an Autonomous Emergency Braking (AEB), a Forward Collision Warning System (FCW), an Adaptive Cruise Control (ACC), and a Lane Departure Warning System (LDWS), a Lane Keeping Assist System (LKAS), a Blind Spot Detection (BSD), Rear-end Collision Warning System (RCW), a Smart Parking Assist System (SPAS), and the like.

Such an autonomous vehicle may operate in an autonomous driving mode as well as in an autonomous parking mode. For example, when a driver requests parking using a smartphone after getting out of a parking lot, the autonomous vehicle may enter the parking lot through an autonomous driving, and then may search a parking space and may park itself. Thereafter, when the driver requests to get out of the parking lot using the smartphone at the entrance of the parking lot, the autonomous vehicle may perform an autonomous driving from the parking position in the parking lot to the entrance of the parking lot.

A conventional control apparatus of an autonomous vehicle may perform an operation corresponding to an operation mode by performing rebooting whenever the operation mode is changed, and by loading a file (or an image) corresponding to the operation mode from a read only memory (ROM) into a random access memory (RAM) in the rebooting process. For example, driving files and parking files are stored in the ROM, and the control apparatus loads the parking files into the RAM through the rebooting when the operation mode is changed from the driving mode to the parking mode, and loads the driving files into the RAM through the rebooting when the operation mode is changed from the parking mode to the driving mode. Therefore, because the conventional control apparatus of the autonomous vehicle needs to be rebooted every time the operation mode is changed, a fatal problem may be caused in an autonomous driving environment that needs to respond in real time due to a time delay required for rebooting.

Another conventional control apparatus of the autonomous vehicle includes a first hardware processor for performing a driving operation and a second hardware processor for performing a parking operation therein, respectively, activating the first hardware processor in the driving mode, activates the first hardware processor in the driving mode, and activates the second hardware processor in the parking mode. Accordingly, such other conventional control apparatus of the autonomous vehicle increases the structural complexity of the hardware processor, and also causes an increase in manufacturing cost.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for controlling an autonomous vehicle capable of operating the autonomous vehicle in a parking mode as well as a driving mode with only one hardware processor without a reboot process, by scheduling a plurality of tasks corresponding to each operation mode of the autonomous vehicle for each core and adjusting an execution time of a task in each core based on a current operation mode of the autonomous vehicle, to solve the problems of the related art as described above.

The technical problems to be solved by the present disclosure are not limited to the aforementioned problems, and any other technical problems not mentioned herein will be clearly understood from the following description by those skilled in the art to which the present disclosure pertains. Furthermore, it will be easily understood that the objects and advantages of the present disclosure are realized by means and combinations described in the appended claims.

According to an aspect of the present disclosure, a control apparatus of an autonomous vehicle includes a plurality of cores, and a scheduler that schedules a plurality of tasks corresponding to each operation mode of the autonomous vehicle for each of the cores, and adjusts an execution time of a task in each core based on a current operation mode of the autonomous vehicle.

According to an exemplary embodiment of the present disclosure, the operation mode may include a driving mode and a parking mode.

According to an exemplary embodiment of the present disclosure, the scheduler may maintain a basic execution time of tasks to be executed in the driving mode when the autonomous vehicle operates in the driving mode, and may change a basic execution time of tasks to be executed in the parking mode to a preset execution time.

According to an exemplary embodiment of the present disclosure, the scheduler may change a basic execution time of tasks to be executed in the driving mode to a preset execution time when the autonomous vehicle operates in the parking mode, and may maintain a basic execution time of tasks to be executed in the parking mode.

According to an exemplary embodiment of the present disclosure, the scheduler may schedule tasks to be executed in the driving mode and tasks to be executed in the parking mode for each core.

According to an exemplary embodiment of the present disclosure, the scheduler may set an execution priority of the tasks to be executed in the driving mode higher than an execution priority of the tasks to be executed in the parking mode.

According to an exemplary embodiment of the present disclosure, the scheduler may schedule tasks to be executed in the driving mode and tasks to be executed in the parking mode in a time-overlapping fashion for each core.

According to an exemplary embodiment of the present disclosure, the scheduler may set an execution priority of the tasks to be executed in the driving mode higher than an execution priority of the tasks to be executed in the parking mode.

According to an exemplary embodiment of the present disclosure, the scheduler may schedule the plurality of tasks in at least one of an event-triggered method and a time-triggered method.

According to an aspect of the present disclosure, a control method for an autonomous vehicle includes scheduling a plurality of tasks corresponding to each operation mode of the autonomous vehicle for each of the cores, and adjusting an execution time of a task in each core based on a current operation mode of the autonomous vehicle.

According to an exemplary embodiment of the present disclosure, the operation mode may include a driving mode and a parking mode.

According to an exemplary embodiment of the present disclosure, the adjusting of the execution time of the task in each core may include maintaining a basic execution time of tasks to be executed in the driving mode when the autonomous vehicle operates in the driving mode, and changing a basic execution time of tasks to be executed in the parking mode to a preset execution time when the autonomous vehicle operates in the driving mode.

According to an exemplary embodiment of the present disclosure, the adjusting of the execution time of the task in each core may include changing a basic execution time of tasks to be executed in the driving mode to a preset execution time when the autonomous vehicle operates in the parking mode, and maintaining a basic execution time of tasks to be executed in the parking mode when the autonomous vehicle operates in the parking mode.

According to an exemplary embodiment of the present disclosure, the scheduling of the plurality of tasks for each core may include scheduling tasks to be executed in the driving mode and tasks to be executed in the parking mode for each core. In the instant case, the scheduling of the plurality of tasks for each core may further include setting an execution priority of the tasks to be executed in the driving mode higher than an execution priority of the tasks to be executed in the parking mode.

According to an exemplary embodiment of the present disclosure, the scheduling of the plurality of tasks for each core may include scheduling tasks to be executed in the driving mode and tasks to be executed in the parking mode in a time-overlapping fashion for each core. In the instant case, the scheduling of the plurality of tasks for each core may further include setting an execution priority of the tasks to be executed in the driving mode higher than an execution priority of the tasks to be executed in the parking mode.

According to an exemplary embodiment of the present disclosure, the scheduling of the plurality of tasks for each core may include scheduling the plurality of tasks in at least one of an event-triggered method and a time-triggered method.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a diagram illustrating a process in which a scheduler included in a control apparatus of an autonomous vehicle, according to an exemplary embodiment of the present disclosure adjusts an execution time of a task in each core based on a current operation mode of the autonomous vehicle;

FIG. 5 is a diagram illustrating an algorithm in which a scheduler included in a control apparatus of an autonomous vehicle, according to an exemplary embodiment of the present disclosure adjusts an execution time of a task in each core based on a current operation mode of the autonomous vehicle;

FIG. 6 is a diagram illustrating an algorithm performed by a parking application applied to a control apparatus of an autonomous vehicle, according to an exemplary embodiment of the present disclosure;

FIG. 7 is a diagram illustrating an algorithm performed by a driving application applied to a control apparatus of an autonomous vehicle, according to an exemplary embodiment of the present disclosure;

Figure 1:
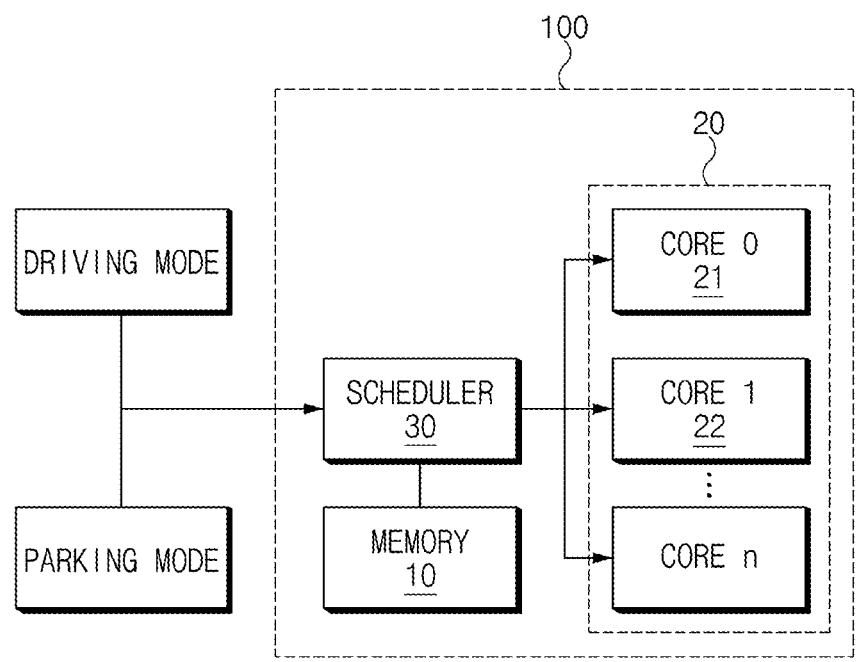
FIG. 1 is a diagram illustrating a configuration of a control apparatus of an autonomous vehicle, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment according to an exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

FIG. 1 is a diagram illustrating a configuration of a control apparatus of an autonomous vehicle, according to an exemplary embodiment of the present disclosure, which may be implemented in a form of hardware or implemented in a form of software, or implemented in a form of a combination of hardware and software. It may be implemented as a microprocessor in a form of a single chip, but is not limited thereto.

As illustrated in FIG. 1, a control apparatus 100 for an autonomous vehicle according to an exemplary embodiment of the present disclosure may include a memory 10, a core 20, and a scheduler 30. In the instant case, according to a method of implementing the control apparatus 100 for an autonomous vehicle according to an exemplary embodiment of the present disclosure, each component may be combined with each other to be implemented as one, or some components may be omitted.

Referring to each of the components, first, the memory 10 may store various logics, algorithms, and programs required in a process of scheduling a plurality of tasks corresponding to each operation mode of the autonomous vehicle for each core and adjusting an execution time of a task in each core based on a current operation mode of the autonomous vehicle.

The memory 10 may store an event-triggered scheduling algorithm, a time-triggered scheduling algorithm, and a scheduling algorithm in which an event-triggered method and a time-triggered method are mixed.

The memory 10 may store a model (hereinafter, a scheduling model) in which various tasks required in a driving mode and various tasks required in a parking mode are scheduled for each core.

The memory 10 may store an execution time in the driving mode and an execution time (e.g., 0.1 ms) in the parking mode for each task corresponding to the driving mode, and may store an execution time (e.g., 0.1 ms) in the driving mode and an execution time in the parking mode for each task corresponding to the parking mode.

The memory 10 may include at least one type of storage medium of a memory such as a flash memory type, a hard disk type, a micro type, and a card type (e.g., a Secure Digital card (SC card) or an EXtream Digital card (XD card)), and a memory such as a Random Access Memory (RAM), a Static RAM (SRAM), a Read-Only Memory (ROM), a Programmable ROM (PROM), an Electrically Erasable PROM (EEPROM), a Magnetic RAM (MRAM), a magnetic disk, and optical disk type memory.

The core 20 may include a plurality of cores, and each core executes tasks corresponding to the driving mode in the driving mode and executes tasks corresponding to the parking mode in the parking mode.

The scheduler 30 may be, for example, a master scheduler, and may schedule a plurality of tasks corresponding to each operation mode of the autonomous vehicle for each core, and may adjust an execution time of a task in each core based on a current operation mode of the autonomous vehicle.

The scheduler 30 may identify the setting or release of a parking mode button provided in the autonomous vehicle through a vehicle network, and the setting or release of the reverse gear, and also may identify the surrounding environment through various sensor information. In the instant case, the vehicle network may include a Controller Area Network (CAN), a Controller Area Network with Flexible Data-rate (CAN FD), a Local Interconnect Network (LIN), a FlexRay, a Media Oriented Systems Transport (MOST), an Ethernet, and the like.

The scheduler 30 may determine the current operation mode of the autonomous vehicle as the parking mode in response to the setting of the parking mode button by a driver, and may determine the current operation mode of the autonomous vehicle as the driving mode in response to the release of the parking mode button by a driver.

The scheduler 30 may determine the current operation mode of the autonomous vehicle as the parking mode in response to the setting of a reverse gear, and may determine the current operation mode of the autonomous vehicle as the driving mode in response to the release of the reverse gear.

The scheduler 30 may receive information of the driving mode or the parking mode from an operation mode determination system (a controller) provided in the autonomous vehicle.

Hereinafter, detailed operations of the scheduler 30 will be described with reference to FIG. 2, FIG. 3, FIG. 4, FIG. 5, FIG. 6, and FIG. 7.

Figure 2:
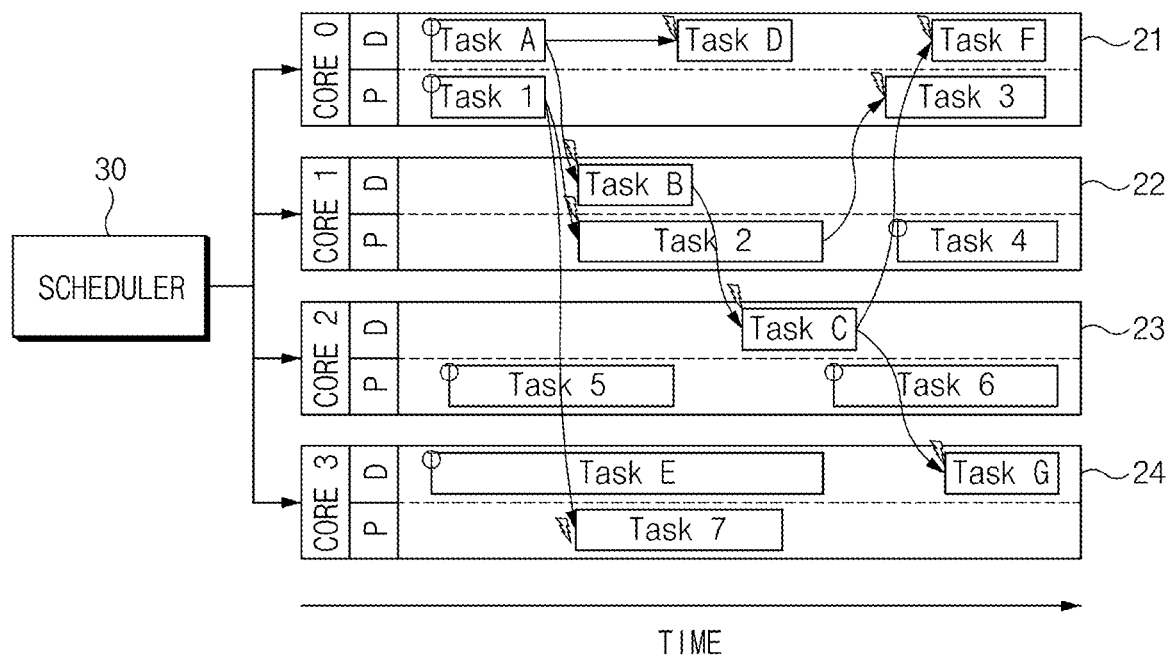
FIG. 2 is a diagram illustrating a result of scheduling tasks in a driving mode and tasks in a parking mode for each core by a scheduler included in a control apparatus of an autonomous vehicle, according to an exemplary embodiment of the present disclosure.

FIG. 2 is a diagram illustrating a result of scheduling tasks in a driving mode and tasks in a parking mode for each core by a scheduler included in a control apparatus of an autonomous vehicle, according to an exemplary embodiment of the present disclosure.

The scheduler 30 may schedule tasks to be executed in the driving mode and tasks to be executed in the parking mode for each core, based on the scheduling model stored in the memory 10. In the instant case, because the scheduling method itself is not the subject of the present disclosure, any method may be used.

In FIG. 2, a task A, a task B, a task C, a task D, a task E, a task F, and a task G indicate tasks to be executed in the driving mode, and a task 1, a task 2, a task 3, a task 4, a task 5, a task 6, and a task 7 indicate tasks to be executed in the parking mode.

As illustrated in FIG. 2, the scheduler 30 sequentially schedules the task A, the task D, and the task F to be executed in the driving mode to a core 0 (21), and also sequentially schedules the task 1 and the task 3 to be executed in the parking mode to the core 0 (21). Furthermore, the scheduler 30 schedules the task B to be executed in the driving mode to a core 1 (22), and sequentially schedules the task 2 and the task 4 to be executed in the parking mode to the core 1 (22). Furthermore, the scheduler 30 schedules the task C to be executed in the driving mode to a core 2 (23), and sequentially schedules the task 5 and the task 6 to be executed in the parking mode to the core 2 (23). Furthermore, the scheduler 30 sequentially schedules the task E and the task G to be executed in the driving mode to a core 3 (24), and also schedules the task 7 to be executed in the parking mode to the core 3 (24).

In the instant case, in the core 0 (21), the task A and the task 1 are scheduled in a time-triggered method, and the task D, the task F, and the task 3 are scheduled in an event-triggered method. Furthermore, in the core 1 (22), the task B, the task, and the task 2 are scheduled in the event-triggered method, and the task 4 is scheduled in the time-triggered method. Furthermore, in the core 2 (23), the task C is scheduled in the event-triggered method, and the task 5 and the task 6 are scheduled in the time-triggered method. Furthermore, in the core 3 (24), the task E is scheduled in the time-triggered method, and the task G and the task 7 are scheduled in the event-triggered method.

Figure 3:
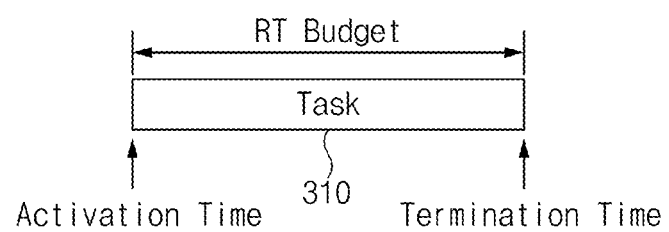
FIG. 3 is a diagram for describing, as an exemplary embodiment of the present disclosure, tasks scheduled by a scheduler included in a control apparatus of an autonomous vehicle, according to an exemplary embodiment of the present disclosure.

FIG. 3 is a diagram for describing, as an exemplary embodiment of the present disclosure, tasks scheduled by a scheduler included in a control apparatus of an autonomous vehicle, according to an exemplary embodiment of the present disclosure.

As illustrated in FIG. 3, a starting point of the bar 310 indicating the task indicates an activation time of the task, an ending point of the bar 310 indicates a termination time of the task, and a length of the bar 310 indicates a worst-case execution time (WCET) of the task as a run-time budget of the task.

Returning to FIG. 2, in general, tasks to be executed in the driving mode have a higher execution priority than tasks to be executed in the parking mode. Accordingly, the task corresponding to the parking mode cannot be executed while the task corresponding to the driving mode is being executed. For example, in the core 0 (21), the task A and the task 1 are located in the same time zone, and the task 1 cannot be executed while the task A is being executed.

This is an issue necessarily accompanied in a process of operating the autonomous vehicle in the driving mode as well as the parking mode with only one hardware processor without a reboot process, but the scheduler 30 according to an exemplary embodiment of the present disclosure proposes a solution to the present as illustrated in FIG. 4.

FIG. 4 is a diagram illustrating a process in which a scheduler included in a control apparatus of an autonomous vehicle, according to an exemplary embodiment of the present disclosure adjusts an execution time of a task in each core based on a current operation mode of the autonomous vehicle.

As illustrated in FIG. 4, the tasks executed in the driving mode include, for example, the task A, the task B, the task C, the task D, the task E, the task F, and the task G, and the tasks executed in the parking mode include, for example, the task 1, the task 2, the task 3, the task 4, the task 5, the task 6, and the task 7. In the instant case, a preset task is exemplified for better understanding, but the number of tasks may vary in accordance with a design environment. Also, each task has a set basic execution time. For example, the basic execution time of the task A is 10 ms, the basic execution time of the task B is 9 ms, the basic execution time of the task G is 5 ms, the basic execution time of the task 1 is 1 ms, the basic execution time of the task 2 is 5 ms, and the basic execution time of the task 7 is 20 ms.

When a current operation mode of the autonomous vehicle is in the driving mode, the scheduler 30 may maintain the basic execution time of tasks to be executed in the driving mode for each core, and may change the basic execution time of the tasks to be executed in the parking mode to the preset execution time (e.g., 0.1 ms). For example, in the parking mode, the execution time of the task A, the task B, the task C, the task D, the task E, the task F, and the task G may be 0.1 ms.

When the current operation mode of the autonomous vehicle is in the parking mode, the scheduler 30 may change the basic execution time of tasks to be executed in the driving mode for each core to a preset execution time (e.g., 0.1 ms), and may maintain the basic execution time of tasks to be executed in the parking mode. For example, the execution time of the task 1, the task 2, the task 3, the task 4, the task 5, the task 6, and the task 7 in the driving mode may be 0.1 ms.

FIG. 5 is a diagram illustrating an algorithm in which a scheduler included in a control apparatus of an autonomous vehicle, according to an exemplary embodiment of the present disclosure adjusts an execution time of a task in each core based on a current operation mode of the autonomous vehicle.

As illustrated in FIG. 5, as an algorithm representing the process of adjusting the basic execution time of the task A, the scheduler 30 may maintain the basic execution time of task A of 10 ms when a current operation mode of the autonomous vehicle is in the driving mode, and may change the basic execution time of the task A of 10 ms to a preset execution time of 0.1 ms when the current operation mode of the autonomous vehicle is in the parking mode.

FIG. 6 is a diagram illustrating an algorithm performed by a parking application applied to a control apparatus of an autonomous vehicle, according to an exemplary embodiment of the present disclosure.

As illustrated in FIG. 6, the parking application operates in an idle processing mode when the autonomous vehicle operates in the driving mode, and operates in a running processing mode when the autonomous vehicle operates in the parking mode. In the instant case, the scheduler 30 may transfer information on the operation mode of the autonomous vehicle to the parking application.

FIG. 7 is a diagram illustrating an algorithm performed by a driving application applied to a control apparatus of an autonomous vehicle, according to an exemplary embodiment of the present disclosure.

As illustrated in FIG. 7, the driving application operates in the running processing mode when the autonomous vehicle operates in the driving mode, and operates in the idle processing mode when the autonomous vehicle operates in the parking mode. In the instant case, the scheduler 30 may transfer information on the operation mode of the autonomous vehicle to the driving application.

Figure 8:
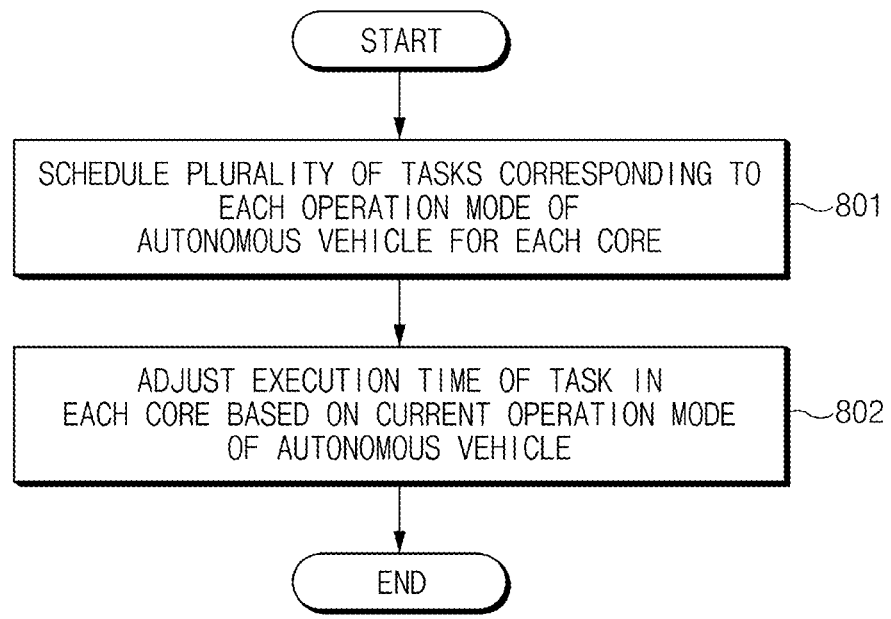
FIG. 8 is a flowchart illustrating a method of controlling an autonomous vehicle, according to an exemplary embodiment of the present disclosure.

FIG. 8 is a flowchart illustrating a method of controlling an autonomous vehicle, according to an exemplary embodiment of the present disclosure.

First, the scheduler 30 schedules a plurality of tasks corresponding to each operation mode of the autonomous vehicle for each core (801).

Thereafter, the scheduler 30 adjusts the execution time of a task in the each core based on a current operation mode of the autonomous vehicle (802). In the instant case, when the autonomous vehicle operates in the driving mode, the scheduler 30 may maintain the basic execution time of tasks to be executed in the driving mode, and may change the basic execution time of tasks to be executed in the parking mode to a preset execution time. Furthermore, when the autonomous vehicle operates in the parking mode, the scheduler 30 may change the basic execution time of tasks to be executed in the driving mode to a preset execution time, and may maintain the basic execution time of the tasks to be executed in the parking mode.

Figure 9:
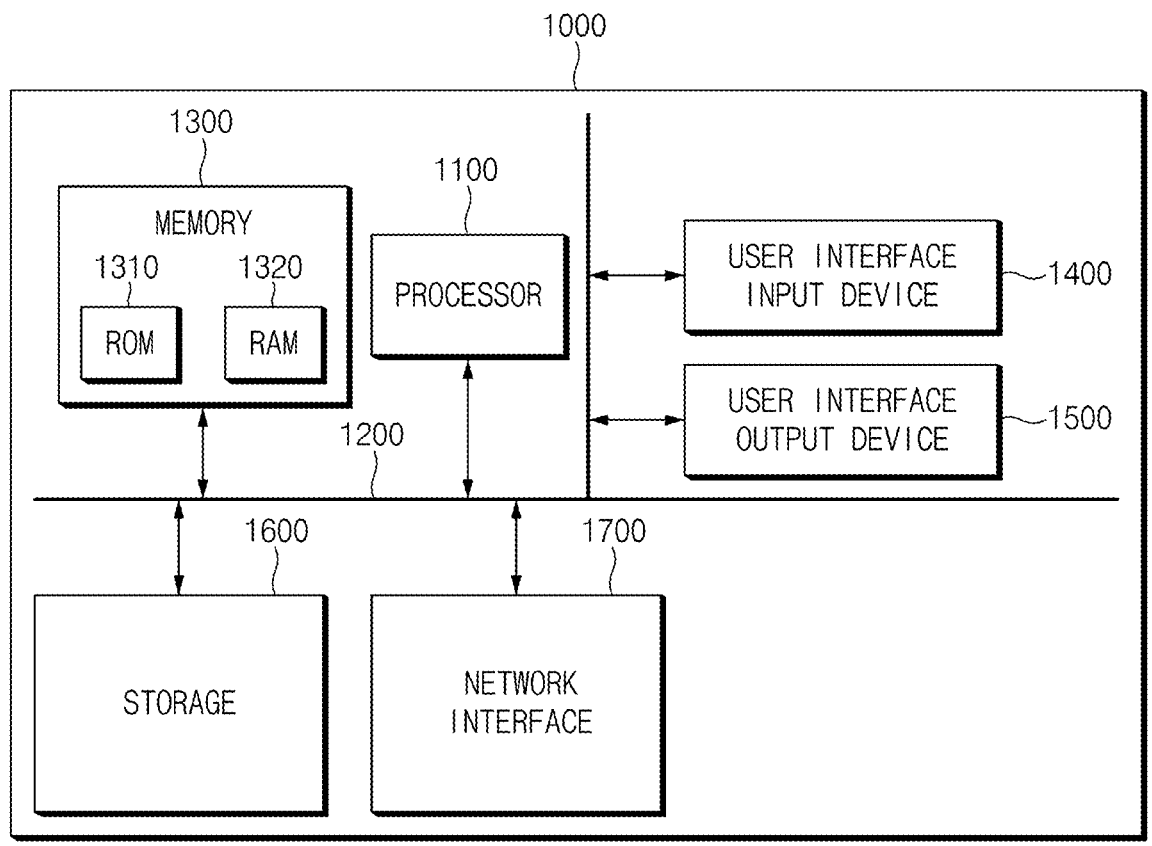
FIG. 9 is a block diagram illustrating a determining system for executing a method for controlling an autonomous vehicle, according to an exemplary embodiment of the present disclosure.

FIG. 9 is a block diagram illustrating a computing system for executing a method for controlling an autonomous vehicle, according to an exemplary embodiment of the present disclosure.

Referring to FIG. 9, the above-described control method for the autonomous vehicle according to an exemplary embodiment of the present disclosure may be implemented through a computing system. A computing system 1000 may include at least one processor 1100, a memory 1300, a user interface input device 1400, a user interface output device 1500, storage 1600, and a network interface 1700, which are connected to each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an exemplary embodiment of the present disclosure, an apparatus and method for controlling an autonomous vehicle may operate the autonomous vehicle in a parking mode as well as a driving mode with only one hardware processor without a reboot process, by scheduling a plurality of tasks corresponding to each operation mode of the autonomous vehicle for each core and adjusting the execution time of a task in each core based on a current operation mode of the autonomous vehicle.

The above description is merely illustrative of the technical idea of the present disclosure, and those of ordinary skill in the art to which the present disclosure pertains will be able to make various modifications and variations without departing from the essential characteristics of the present disclosure.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control apparatus of an autonomous vehicle, the control apparatus comprising:
   a plurality of cores; and
   a scheduler configured for scheduling a plurality of tasks corresponding to each operation mode of the autonomous vehicle for each of the cores, and for adjusting an execution time of a task in each core based on a current operation mode of the autonomous vehicle,
   wherein the operation mode includes a driving mode and a parking mode, and
   wherein the scheduler is configured to maintain a basic execution time of tasks to be executed in the driving mode when the autonomous vehicle operates in the driving mode, and to change a basic execution time of tasks to be executed in the parking mode to a preset execution time.

2. The control apparatus of claim 1, wherein the scheduler is configured to change the basic execution time of tasks to be executed in the driving mode to a preset execution time when the autonomous vehicle operates in the parking mode, and to maintain the basic execution time of tasks to be executed in the parking mode.

3. The control apparatus of claim 1, wherein the scheduler is configured to schedule tasks to be executed in the driving mode and tasks to be executed in the parking mode for each core.

4. The control apparatus of claim 3, wherein the scheduler is configured to set an execution priority of the tasks to be executed in the driving mode higher than an execution priority of the tasks to be executed in the parking mode.

5. The control apparatus of claim 1, wherein the scheduler is configured to schedule tasks to be executed in the driving mode and tasks to be executed in the parking mode in a time-overlapping fashion for each core.

6. The control apparatus of claim 5, wherein the scheduler is configured to set an execution priority of the tasks to be executed in the driving mode higher than an execution priority of the tasks to be executed in the parking mode.

7. The control apparatus of claim 1, wherein the scheduler is configured to schedule the plurality of tasks in at least one of an event-triggered method and a time-triggered method.

8. A control method for an autonomous vehicle, the control method comprising:
- scheduling, by a scheduler, a plurality of tasks corresponding to each operation mode of the autonomous vehicle for each core; and
- adjusting, by the scheduler, an execution time of a task in each core based on a current operation mode of the autonomous vehicle,
- wherein the operation mode includes a driving mode and a parking mode, and
- wherein the adjusting of the execution time of the task in each core includes:
  - maintaining, by the scheduler, a basic execution time of tasks to be executed in the driving mode when the autonomous vehicle operates in the driving mode; and
  - changing, by the scheduler, a basic execution time of tasks to be executed in the parking mode to a preset execution time when the autonomous vehicle operates in the driving mode.

9. The control method of claim 8, wherein the adjusting of the execution time of the task in each core includes:
- changing, by the scheduler, the basic execution time of tasks to be executed in the driving mode to the preset execution time when the autonomous vehicle operates in the parking mode; and
- maintaining, by the scheduler, the basic execution time of tasks to be executed in the parking mode when the autonomous vehicle operates in the parking mode.

10. The control method of claim 8, wherein the scheduling of the plurality of tasks for each core includes scheduling, by the scheduler, tasks to be executed in the driving mode and tasks to be executed in the parking mode for each core.

11. The control method of claim 10, wherein the scheduling of the plurality of tasks for each core further includes setting, by the scheduler, an execution priority of the tasks to be executed in the driving mode higher than an execution priority of the tasks to be executed in the parking mode.

12. The control method of claim 8, wherein the scheduling of the plurality of tasks for each core includes scheduling, by the scheduler, tasks to be executed in the driving mode and tasks to be executed in the parking mode in a time-overlapping fashion for each core.

13. The control method of claim 12, wherein the scheduling of the plurality of tasks for each core further includes setting, by the scheduler, an execution priority of the tasks to be executed in the driving mode higher than an execution priority of the tasks to be executed in the parking mode.

14. The control method of claim 8, wherein the scheduling of the plurality of tasks for each core includes scheduling, by the scheduler, the plurality of tasks in at least one of an event-triggered method and a time-triggered method.

* * * * *